United States Patent
Kudryavtsev et al.

(10) Patent No.: US 12,350,658 B2
(45) Date of Patent: Jul. 8, 2025

(54) INORGANIC ION-EXCHANGER FOR SELECTIVE EXTRACTION OF LITHIUM FROM LITHIUM-CONTAINING NATURAL AND INDUSTRIAL BRINES

(71) Applicants: Pavel Kudryavtsev, Rehovot (IL); Nikolai Kudriavtsev, Haifa (IL)

(72) Inventors: Pavel Kudryavtsev, Rehovot (IL); Nikolai Kudriavtsev, Haifa (IL)

( * ) Notice: Subject to any disclaimer, the term of this patent is extended or adjusted under 35 U.S.C. 154(b) by 658 days.

(21) Appl. No.: 17/688,047

(22) Filed: Mar. 7, 2022

(65) Prior Publication Data

US 2023/0278023 A1    Sep. 7, 2023

(51) Int. Cl.
*B01J 39/10*    (2006.01)
*C22B 3/42*    (2006.01)
*C22B 26/12*    (2006.01)

(52) U.S. Cl.
CPC .......... *B01J 39/10* (2013.01); *C22B 3/42* (2013.01); *C22B 26/12* (2013.01); *B01J 2523/56* (2013.01); *B01J 2523/69* (2013.01)

(58) Field of Classification Search
CPC .................. C22B 26/12; C22B 3/42
See application file for complete search history.

(56) References Cited

U.S. PATENT DOCUMENTS

| | | |
|---|---|---|
| 7,943,113 B2 | 5/2011 | Chung et al. |
| 8,901,032 B1 | 12/2014 | Harrison et al. |
| 8,926,974 B2 | 6/2015 | Chung et al. |
| 10,434,497 B2 | 10/2019 | Kudryavtsev et al. |

(Continued)

FOREIGN PATENT DOCUMENTS

| | | |
|---|---|---|
| CN | 101944600 A | 1/2011 |
| RU | 1524253 | 2/1994 |

(Continued)

OTHER PUBLICATIONS

Vasudeva Bhat, J. Gopalakrishnan, HNbWO6 and HTaWO6: Novel layered oxides related to the rutile structure. Synthesis and investigation of ion-exchange and Intercalation Behavior, Solid State Ionics vol. 26, p. 25-32 (Year: 1988).*

(Continued)

*Primary Examiner* — Ian A Rummel
*Assistant Examiner* — Annette Phan

(57) ABSTRACT

The invention relates to lithium-selective inorganic ion exchangers for the extraction of lithium from lithium-containing natural and technological brines. More specifically, invention relates to a technology for recovering lithium in the presence of oxidizing or reducing agents. The inorganic ion-exchanger is present in the form of solid particles which are represented by a chemical non-stoichiometric compound in the form of an inorganic polymeric aqua-oxo-hydroxo complex intended for selective extraction of lithium from lithium-containing natural and industrial brines, the inorganic ion-exchanger being represented by the following general formula:

$$H_a NbO_{(2.5+0.5 \cdot a)} \cdot b L_2 O \cdot c WO_3 \cdot d H_2 O;$$

wherein:
"a" is a number ranging from 0.5 to 2.0,
"b" is a number ranging from 0.01 to 0.5,
"c" is a number ranging from 0.01 to 0.2, and
"d" is a number ranging from 0.1 to 2.0.

10 Claims, 1 Drawing Sheet

(56) References Cited

U.S. PATENT DOCUMENTS 11,179,715 B2    11/2021    Kudryavtsev et al.

FOREIGN PATENT DOCUMENTS

| WO | WO2003041857 | 5/2002 |
| WO | WO2011058841 | 5/2011 |

OTHER PUBLICATIONS

Bhat (HNbWO6 and HTaWO6: Novel Layered Oxides Related to the Rutile Structure, Synthesis, and Investigation of Ion Exchange and Intercalation Behavior, 1987 (Solid State Ionics vol. 26 (1988) p. 25-32)) (Year: 1988).*
1) Haiduc, J., "Polymeric Coordination Compounds", Russian Chemical Reviews, 1961, 30(9), pp. 498-526. 2) B. Bunker and W. Casey, "The Aqueous Chemistry of Oxides", Oxford University Press, 2016.

* cited by examiner

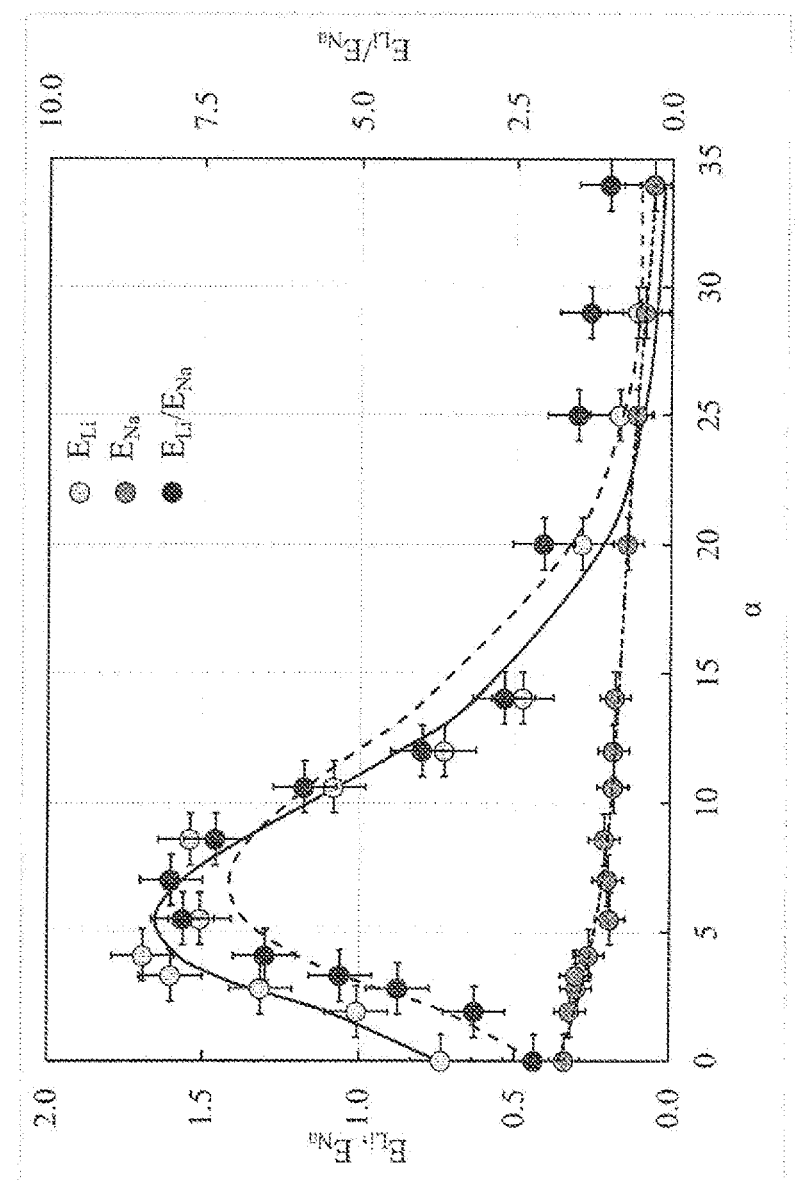

INORGANIC ION-EXCHANGER FOR SELECTIVE EXTRACTION OF LITHIUM FROM LITHIUM-CONTAINING NATURAL AND INDUSTRIAL BRINES

FIELD OF THE INVENTION

The invention relates to the field of chemical technology and hydrometallurgy, in particular, to selective inorganic ion exchangers for the extraction of lithium from lithium-containing natural and technological brines. The exchanger can be used to extract lithium from neutral and slightly alkaline solutions with a high content of sodium ions and ions of other alkali and alkaline earth metals. More specifically, the above invention relates to a technology for recovering lithium in the presence of oxidizing or reducing agents and under conditions of increased radiation.

DESCRIPTION OF THE PRIOR ART

Lithium has historically been obtained from two different sources—continental brines and hard rock minerals. Currently, lithium is used in the production of glass, ceramics, medical substances, metallurgical products, lithium batteries, and in such areas as nuclear energy, aviation, etc. Global sales of lithium salts are now worth more than a billion a year, and a demand for lithium will continue to grow because lithium is an indispensable component of the lithium-ion batteries that are now used as a power source for everything from smartphones, power tools, to electric vehicles.

Lithium demand is forecast to grow by more than 300% in the coming years. Moreover, electric companies are expanding solar energy production and experience a need for lithium-ion batteries of high storage density. The acute dependence of many global industries on lithium has led to a global search for new sources of lithium.

Currently, hydromineral raw materials are gradually becoming the main source of lithium. At the same time, in world practice, the main attention is paid to developing methods for processing lithium-containing hydromineral raw materials. Nowadays, a method that is most often used in practice to extract lithium is the precipitation of sparingly soluble salts from natural brines. From an ecological point of view, however, the most advantageous are methods of extracting lithium by sorption from lithium-poor natural and technological brines. More so, these sources contain main world reserves of lithium. Due to the complexity of the salts contained in the composition of hydromineral raw materials, highly selective inorganic ion-exchange materials become most promising for the realization of the above methods.

Some inventions illustrating the state of the art of extracting lithium using selective inorganic ion-exchange materials are shown below.

Chinese Patent Application Publication CN101944600A published on Jan. 12, 2011 (Inventors: Xichang Shi, et Al.) discloses an ion sieve adsorbent for extraction of lithium ions based on lithium-titanium oxide and a method for preparing a precursor for this ion sieve adsorbent suitable for adsorbing enriched lithium from salt-lake brines, seawater, and other liquid lithium resources. The method consists of using titanium dioxide and lithium salt as raw materials, grinding the raw material in a ball grinder, and drying the ground product for preparing lithium titanate as the precursor through a high-temperature solid-phase roasting process. The lithium is then eluted from the precursor ($Li_2TiO_3$) by inorganic acid to prepare an ion sieve $H_2TiO_3$. According to a preferred embodiment, the process is based on a molar ratio of lithium to titanium of 2:1; anhydrous ethanol or acetone is used as a dispersion medium; grinding is carried out in a ball mill from 2 to 3 hours; the grounded product is calcined at 800° C. for 12 hours; and, as a result, a lithium $Li_2TiO_3$ adsorbent is obtained.

U.S. Pat. No. 8,901,032, issued on Dec. 2, 2014, to Stephen Harrison et al., discloses a method for producing a porous adsorbent based on activated alumina for lithium extraction. The method is carried out by contacting three-dimensional activated alumina with a lithium salt under conditions sufficient to infuse lithium salts into activated alumina for the selective extraction and recovery of lithium from lithium-containing solutions, including brines. Lithium intercalated sorbent based on activated alumina provides a controlled and maximum permissible lithium to aluminum ratio and a favorable structural shape and dispersed composition, thereby increasing throughput for extracting lithium. In certain embodiments, the lithium intercalated sorbent based on activated alumina has a molar fraction ratio of lithium to aluminum in the range of about 0.1 to 0.3 and preferably up to about 0.33. The ratio of lithium to alumina is critical in stabilizing the structural form of the material and maximizing the number of lithium sites available in the matrix for loading and unloading of lithium from the brine solution.

International Patent Application Publication No. WO2003041857 A1, published on May 22, 2003 (Inventor: Alexander Ryabstsev, et al.), relates to a method for producing granulated sorbents in the form of the double hydroxide of aluminum and lithium in a waste-free solid phase of aluminum hydroxide and lithium salts in a mixer, with subsequent continuous activation of crystalline DHAL-CI in a centrifugal mill activator to obtain a defective crystalline structure. The obtained product is mixed with chlorinated polyvinyl chloride as a binding agent and liquid methylene chloride. The granulated sorbent is suitable for selective lithium extraction from chloride salt minerals with an extraction degree of 95 at. %. Also known is Russian Patent No. 1524253, issued on Feb. 15, 1994, to Melikhov et al. This patent relates to ion exchange removal of lithium from solutions. The method includes the steps of passing the solutions through a sorption material consisting of a sorbent selective to lithium and based on manganese oxides or manganese and aluminum oxides in a hydrogen form and an auxiliary sorbent in a salt form, followed by their regeneration, respectively, with a solution of nitric acid and alkaline solution. The method is characterized in that, to increase the degree of lithium recovery from the natural and technological brines, as well as the degree of regeneration of the auxiliary sorbent and the reduction of the regeneration time, the sorbent is selective to lithium in an alkaline medium based on titanium hydroxide, the transmission is conducted through alternating layers of the selective and auxiliary sorbents, and the regeneration of the auxiliary sorbent is carried out with the original lithium solution at pH 12-13. A hydrated titanium dioxide or a mixed hydroxide of titanium and iron is used as an auxiliary sorbent. A disadvantage of this method is that the obtained sorbent has low stability in the presence of oxidants or reducing agents.

U.S. Pat. No. 7,943,113, May 17, 2011 (Chung; Kang-Sup и др.) discloses a method for preparing lithium-manganese oxides comprising: solid mixing lithium raw material, manganese raw material, and metal raw material—the material is expressed as the following chemical formula to manufacture mixture; and heat-treating the mixture under reduction atmosphere, $Li_{1+x}Mn_{1-x-y}M_yO_{2+z}$, wherein $0.01 \geq x \geq 0.5$, 0≥y≥0.3, −0.2≥z≥0.2, and M is a metal selected from the group consisting of Mn, V, Cr, Co, Ni, Cu, Zn, Zr, Nb, Mo, W, Ag, Sn, Ge, Si, Al, and an alloy thereof, and wherein the lithium-manganese oxides have a layered structure.

U.S. Pat. No. 8,926,874, Jan. 6, 2015 (Chung; Kang-Sup и др.) discloses a porous manganese oxide absorbent for lithium having spinel-type structure and a method of manufacturing the same. This invention relates to a porous manganese oxide-based lithium absorbent and a method for preparing the same. The method includes the steps of preparing a mixture by mixing a reactant for the synthesis of a lithium-manganese oxide precursor powder with an inorganic binder, molding the mixture, preparing a porous lithium-manganese oxide precursor molded body by heat-treating the molded mixture, and acid-treating the porous lithium-manganese oxide precursor molded body such that lithium ions of the porous lithium-manganese oxide precursor are exchanged with hydrogen ions, wherein pores are formed in the lithium-manganese oxide precursor molded body by gas generated in the heat treatment. The method comprises the steps of preparing a lithium-manganese oxide precursor molded body by preparing a mixture by adding an additive comprising at least one selected from the group consisting of carbon powder, carbon nanotubes (CNT), polyethylene (PE), and polypropylene (PP) to a lithium-manganese oxide precursor reactant, adding water glass to the mixture. Heat-treating the resulting mixture, wherein the water glass is added in an amount of 10 to 60 parts by weight concerning 100 parts by weight of the mixture. Acid-treating the lithium-manganese oxide precursor molded body, wherein in the heat treatment, pores are formed in the lithium-manganese oxide precursor molded body by gas generated by decomposition of the lithium manganese oxide precursor reactant or the water glass.

International Patent Application Publication No WO 2011058841 Priority Applications May 22, 2003. This patent describes a method for producing raw materials for a lithium adsorbent, concentrating lithium, and an apparatus for concentrating lithium. This method comprises a mechanochemical step for mixing trimanganese tetraoxide and lithium hydroxide such that the molar ratio of manganese (x) and lithium (y) is x:y=1:1 to 1.5:1, and subjecting the mixture to mechanochemical pulverization; a pre-calcining step for then pre-calcining in a temperature range of 375° C. to 450° C. in the air or an oxygen atmosphere; a calcining step for then cooling, mixing, and pulverizing, followed by calcining in a temperature range of 475° C. to 550° C. in the air or an oxygen atmosphere to obtain a spinel-type lithium manganate with excess oxygen; an elution step for eluting lithium by treating the spinel-type lithium manganate with excess oxygen using acid in an amount that is in large excess for the amount of lithium. U.S. Pat. No. 10,434,497 filed on Dec. 14, 2017, by P. Kudryavtsev et al., for a "Method of Obtaining Inorganic Sorbents for Extracting Lithium from Lithium-Containing Natural and Technological Brines" discloses a method of obtaining inorganic sorbents for extracting lithium from lithium-containing natural and technological brines. The method is carried out by contacting a soluble niobate (V) with an acid in the presence of at least one zirconium (IV) salt to obtain a precipitate of a mixed hydrated niobium and zirconium oxide. Subsequent steps include granulating the precipitate by freezing, converting the granulation product into a Li-form, calcining the Li-form, and converting the obtained granulated mixed lithium, niobium, and zirconium oxide into an ion-exchanger in an H-form. The inorganic sorbent is ready for use in lithium extraction processes in the obtained H-form.

U.S. Pat. No. 11,179,715 issued to P. Kudryavtsev et al. on Nov. 23, 2021, relates to an Inorganic ion-exchanger for selective lithium extraction from lithium-containing natural and industrial brines. The inorganic ion-exchanger is a non-stoichiometric compound in the form of a polymeric aqua-oxo-hydroxo complex. It is intended for selective extraction of lithium from lithium-containing natural and industrial brines. The following general formula represents the proposed ion-exchanger: $H_aNbO_{(2.5+0.5 \cdot a)} \cdot cZrO_2 \cdot dH_2O$, wherein: "a" is a number ranging from 0.5 to 1.5, "c" is a number ranging from 0.01 to 1.0, "d" is a number ranging from 0.1 to 2.0. The inorganic ion-exchanger is a polymeric aqua-oxo-hydroxo complex of niobium and zirconium in the form of solid particles.

BRIEF DESCRIPTION OF THE DRAWING

FIG. 1 shows the dependence of the capacity on lithium ($E_{Li}$), the capacity on lithium ($E_{Na}$) and the separation factor for the ion of lithium and sodium ($P_{Li,Na}$) on the content in the sorbent of tungsten ions, where α is the content of $W^{6+}$ in the sorbent in atomic percent; In this drawing, Curve $E_{Li}$ corresponds to lithium sorbent capacity obtained by using a lithium and sodium salts solution at the ionic ratio $Li^+:Na^+=1:10$, pH=12; Curve $E_{Na}$ corresponds to sodium capacity of the sorbent obtained from the same solution; Curve $P_{Li,Na}$ corresponds to the separation factor for the ion of lithium and sodium obtained from the same solution; the calcination temperature of the samples was 500±20° C.

SUMMARY OF THE INVENTION

The invention provides an ion-exchanger selective to lithium. Such an ion-exchanger is intended to extract lithium from natural and technological brines.

An inorganic ion-exchanger of the present invention is a chemical non-stoichiometric compound, which constitutes an inorganic polymeric aqua-oxo-hydroxo complex intended for selective extraction of lithium from lithium-containing natural and industrial brines and represented by the following general formula:

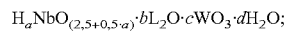

$$H_aNbO_{(2.5+0.5 \cdot a)} \cdot bL_2O \cdot cWO_3 \cdot dH_2O;$$

wherein:
"a" is a number ranging from 0.5 to 2.0,
"b" is a number ranging from 0.01 to 0.5,
"c" is a number ranging from 0.01 to 0.2, and
"d" is a number ranging from 0.1 to 2.0.

If the value of "a" is less than 0.5, the sorbent's ion-exchange capacity will decrease, and this, in turn, will decrease the sorbent efficiency. The value of "a" exceeding 2.0 will increase the solubility of the sorbent and thus will increase the loss of the sorbent in multiple-cycle processes of sorption-desorption.

The parameter "b" has a value that varies from 0.01 to 0.5, depending on the parameter "c" and the material synthesis temperature. In other words, If the value of "c" is less than 0.01, this will decrease the sorbent ion exchange capacity and the sorbent efficiency. The same result will occur if the value of "c" exceeds 0.2.

If the value of "d" is less than 0.1, this will decrease the ion-exchange capacity of the sorbent and thus reduce its performance efficiency. On the other hand, if the value of "d" exceeds 2.0, this will increase the solubility of the sorbent and thus will increase the loss of the sorbent in multiple-cycle processes of sorption-desorption (see data in the tables below).

DETAILED DESCRIPTION OF THE INVENTION

The invention relates to the field of chemical technology, namely, to selective inorganic sorbents (inorganic ion-exchangers) for extracting lithium from natural and technological brines. The invention may be used to extract lithium from neutral and slightly alkaline solutions with a high content of sodium ions and ions of other metals. In particular, the invention relates to an inorganic ion-exchanger for selective extraction of lithium from lithium-containing natural and industrial brines.

The term "brines" used in the context of the present patent specification covers any natural or technological solutions that contain lithium.

Ion exchangers, also known as ionic sieves, are inorganic ion-exchange sorbents that exhibit the so-called ion-sieve effect, which is the effect of separation of ions in a solution following the difference in their ionic radii and charges. Dimensions of ionic positions in the material's crystal structure correspond to certain ions; therefore, larger size ions cannot enter unspecified positions. A unique feature of the ion-exchanger of the invention is its specific structure that provides high selectivity, especially to lithium ions.

It is also important to note that in the context of the present specification, the term "mixed hydrated niobium and tungsten oxide" does not mean a mechanical mixture of the hydrated niobium oxide with a hydrated tungsten oxide but rather means a chemical compound of a non-stoichiometric composition.

The objective of the invention is to provide an ion-exchanger selective to lithium. Such an ion-exchanger is intended to extract lithium from natural and technological brines.

An inorganic ion-exchanger of the present invention is a chemical non-stoichiometric compound, which constitutes an inorganic polymeric aqua-oxo-hydroxo complex intended for selective extraction of lithium from lithium-containing natural and industrial brines and represented by the following general formula:

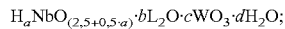

$$H_aNbO_{(2.5+0.5 \cdot a)} \cdot bL_2O \cdot cWO_3 \cdot dH_2O;$$

wherein:
"a" is a number ranging from 0.5 to 2.0,
"b" is a number ranging from 0.01 to 0.5,
"c" is a number ranging from 0.01 to 0.2, and
"d" is a number ranging from 0.1 to 2.0

If the value of "a" is less than 0.5, the sorbent's ion-exchange capacity will decrease, and this, in turn, will decrease the sorbent efficiency. The value of "a" exceeding 2.0 will increase the solubility of the sorbent and thus will increase the loss of the sorbent in multiple-cycle processes of sorption-desorption.

The parameter "b" has a value that varies from 0.01 to 0.5, depending on the parameter "c" and the material synthesis temperature.

If the value of "c" is less than 0.01, this will decrease the sorbent ion exchange capacity and the sorbent efficiency. The same result will occur if the value of "c" exceeds 0.2.

If the value of "d" is less than 0.1, this will decrease the ion-exchange capacity of the sorbent and thus reduce its performance efficiency. On the other hand, if the value of "d" exceeds 2.0, this will increase the solubility of the sorbent and thus will increase the loss of the sorbent in multiple-cycle processes of sorption-desorption (see data in the tables below).

For use in the lithium-extraction process, it is preferable to have the inorganic ion-exchanger of the invention in the form of solid particles with dimensions ranging from 0.1 to 2.0 mm. On the one hand, with the size of particles less than 0.1 mm, it will be difficult to handle the sorbent in ion-exchange columns because of the passage of the particles into the lower part of the column through the cells of the filtering partitions. In other words, the size of particles exceeding 2.0 mm will delay the ion-exchange rate because of retardation of diffusion of lithium in the sorbent particles that occur in the ion-exchange process.

As mentioned above, the inorganic polymeric aqua-oxo-hydroxo complex is a complex of niobium and tungsten. It is a mixed polynuclear complex with a total ion exchange capacity of at least 2.8 meq/g and an ion-exchange capacity specifically to lithium of at least 2.5 meq/g.

What is meant under the term "mixed polynuclear complex" in the context of the present patent application is polynuclear coordination compounds, in the molecules of which there are several metal atoms surrounded by ligands and linked to each other through bridging groups. Bi- and trinuclear coordination compounds are the most studied. When the number of metal atoms is large, such compounds are called coordination or metal-containing polymers, metal polymers. The ratio between polynuclear compounds and coordination polymers is the same as between monomers, oligomers, and polymers in carbon chain high molecular weight compounds. Polynuclear compounds are sometimes referred to as compounds containing cells of directly bonded metal atoms, commonly referred to as clusters. There are homo- and heterometallic polynuclear compounds. The materials that are the subject of this application are cross-linked polymeric polynuclear bimetallic coordination compounds.

More detailed information about a mixed polynuclear complex may be found in Haiduc J., "Polymeric Coordination Compounds", Russian Chemical Reviews, 1961, 30 (9), pp. 498-526, and Bunker, Bruce C.; Casey, William H. The aqueous chemistry of oxides [First edition], ISBN 9780199384259, Oxford University Press, 2016, 604 p.

To better understand the present invention, it would be advantageous to consider a method of manufacturing the proposed ion-exchanger. This method is a subject matter of a pending parent patent application of the same applicants.

A method for producing the proposed inorganic ion exchanger consists in contacting soluble niobates (V) with an acid in the presence of tungsten (VI) salts at an atomic ratio of niobium to tungsten in the range from 1 to (0.04÷0.12) to obtain a mixed hydrated oxide of niobium and tungsten in the worm of a precipitate, which is then granulated and converted into a lithium form sorbent (hereinafter referred to as an ion exchanger). Granulation is carried out by freezing the resulting precipitate at a temperature of −4÷−10° C. for 24-48 hours, followed by defrosting the obtained precipitate.

This conversion into a lithium form is carried out by treating the obtained product with a solution of a lithium-containing compound selected from the group consisting of lithium hydroxide LiOH and lithium carbonate $Li_2CO_3$. As a result, a Li-form of a granulated mixed hydrated niobium and tungsten oxide is obtained.

The obtained Li-form product is calcined at an elevated temperature, specifically at 450÷550° C.; the finished product is then treated with an acid solution selected from the group consisting of nitric acid ($HNO_3$), hydrochloric acid (HCl), sulphuric acid ($H_2SO_4$), or chloric acid ($HClO_4$), to obtain a target product, i.e., a hydrogen-form sorbent (from now on referred to as an H-form sorbent).

Soluble niobates suitable for use in the method of the invention method are represented by alkali metal orthoniobates, such as $Li_3NbO_4$, $Na_3NbO_4$, $K_3NbO_4$, $Rb_3NbO_4$, and $Cs_3NbO_4$.

Soluble compounds of tungsten (VI) suitable for use in the method of the invention may be represented by monotungstates based on the anion $WO_4^{2-}$ selected from the group consisting of such compounds as $Li_2WO_4$, $Na_2WO_4$, $K_2WO_4$, $Rb_2WO_4$, $Cs_2WO_4$, and $(NH_4)_2WO_4$.

Examples of H-form sorbents are given below in the section of Examples in Table 1 (the Li-form sorbents are similar and therefore are not included).

The uniqueness of the proposed method lies in the fact that the step of contacting a soluble niobate (V) with acid is carried out in the presence of tungsten (VI) salts and in that the ionic ratio of niobium (V) to tungsten (VI) in their interaction ranges from 1 to (0.04÷0.12). Another feature is that calcination of the precipitate in the Li form is carried out at a temperature in the range of 450 to 550° C.

An optimal ratio between niobium and tungsten in the material is chosen based on the experimental data obtained in studying the dependence of the exchange capacitance of the sorbent on lithium and the separation coefficient for lithium and sodium ions on the content of tungsten ions in the sorbent (FIG. 1).

FIG. 1 shows the dependence of the capacity on lithium ($E_{Li}$), the capacity on lithium ($E_{Na}$) and the separation factor for the ion of lithium and sodium ($P_{Li,Na}$) on the content in the sorbent of tungsten ions, where $\alpha$ is the content of W6+ in the sorbent in atomic percent; In this drawing, Curve $E_{Li}$ corresponds to lithium sorbent capacity obtained by using a lithium and sodium salts solution at the ionic ratio $Li^+:Na^+=1:10$, pH=12; Curve $E_{Na}$ corresponds to sodium capacity of the sorbent obtained from the same solution; Curve $P_{Li,Na}$ corresponds to the separation factor for the ion of lithium and sodium obtained from the same solution; the calcination temperature of the samples was 500±20° C.

The obtained data shown in FIG. 1 indicate that the maximum value of the exchange capacity and selectivity to lithium ions is exhibited by materials whose composition corresponds to the ratio of niobium to tungsten in the range of 1 to (0.04 to 0.12).

The above-described content of the components in the original composition is necessary to maintain the ratio of niobium and tungsten in solution before mixing at a level needed to obtain it in a solid product—mixed hydrated niobium and tungsten oxide. In other words, the entire amount of niobium and tungsten introduced into the system must pass into the solid-state contained in the precipitate.

The optimal conditions needed for heat treatment of the obtained granular material saturated with lithium ions were determined from the experimental data relating to sorption properties of sorbent samples prepared with various W(VI)/Nb(V) ratios in the solid phase. The samples were calcined at different temperatures. The results are shown in tables in examples, which illustrate the influence of the heat treatment temperature in the synthesis of the material on the sorption-selective properties and chemical stability of the obtained sorption materials.

The results of the experiments show that the optimum temperature for calcining the Li-form of the granulated mixed hydrated niobium and tungsten oxide to obtain granulated mixed lithium, niobium, and tungsten oxide (i.e., a tripled mixed oxide, which is a Li-form of an inorganic ion exchanger) is in the range of 400° C. to 500° C. The time needed to keep the material at this temperature for the formation of the sorbent structure should be in the range of 2 to 3 hours. If the heat treatment is carried out under these conditions, the obtained sorbent, which possesses the ion-sieve effect, acquires a maximum exchange capacity and selectivity to lithium ions and is characterized by minimal losses in alternating sorption-desorption cycles.

The remaining operations of the proposed method for obtaining the granulated sorbent based on the precipitate of a mixed hydrated niobium and tungsten oxide and saturating the granulated material with lithium were carried out under the same conditions as in the method disclosed in the U.S. Pat. No. 11,179,715 mentioned above of P. Kudryavtsev, et al. More specifically, the cation exchanger was prepared by precipitation of hydrated niobium pentoxide by mixing 0.1 M solutions of potassium niobate and $ZrCl_4$ in hydrochloric acid, sorbent granulating, saturating the granular product with lithium ions from 0.05÷0.1 M solution of lithium carbonate and then calcinating the product at 500±25° C. for 2÷3 hours. After calcination and conversion to the H-form (treatment with 0.1-0.2 M nitric acid solution), the sorbent was ready for lithium sorption. The obtained sorbent was suitable for extracting lithium from neutral and slightly alkaline solutions in the presence of both oxidizing agents and reducing agents.

The effectiveness of the proposed method is illustrated by the examples given below. However, it is understood that these examples should not be construed as limiting the scope of the invention and that they are given only for illustrative purposes.

The following methods and instruments were used for processing the materials and measuring the properties of the obtained products mentioned in the subsequent examples.

Equipment and Procedures Used in the Method of the Invention

Ion-Exchange Column

As ion-exchange column used in the method of the invention was a standard chromatographic column with a diameter of up to 10 mm. The height of the sorbent layer was maintained in the range of 10 to 15 column diameters. The solution was fed through the column at a constant linear speed, in the range of 1 to 10 mm/s. The feed rate of the solution was maintained by means of a peristaltic pump. During sorption experiments, special measures were taken to prevent air from entering the sorbent layer and partially dry the sorbent granules.

Determination of the Content of Lithium

Determination of lithium in solutions was carried out by the method of emission photometry of a flame. The most intense resonance line in the spectrum of lithium, 670.8 nm, was used for the analysis. This line corresponds to the transition between the energy levels $2^2S_{1/2}$ and $2^{2p0}{}_{3/2}$ at the excitation energy of 1.85 eV. In determining lithium (with the use of the FLAME PHOTOMETER, FP8000 series device; A.KRÜSS Optronic), the sensitivity of the method was 0.001-0.0005 µg Li/ml. Lithium content was determined from the calibration based on reference solutions prepared based on pure metal salts and their mixtures present in the solutions under study, which were close in proportion to the test solutions. Determination of sodium content was carried out similarly.

Determination of the Content of Tungsten and Niobium

X-ray fluorescence spectroscopy was carried out to determine the content of tungsten and niobium in the composition of the investigated sorbent samples. Analysis was carried out on a laboratory energy-dispersive X-ray fluorescence (EDXRF) spectrometer, model Genius IF, the product of Xenemetrix, Israel. X-Ray Source of 50 kV, 50 W with Rh anode, Silicon Drift Detector (SDD) was used. The Genius IF has a unique patented geometry combining eight secondary targets, with eight customizable tube filters used in direct excitation mode to allow optimal excitation of all elements detected in EDXRF. The WAG (Wide Angle Geometry) secondary target technique provides the best tungsten and niobium analysis results. The X-ray tube excites the characteristic K lines of a secondary target (a pure metal) used to excite the sample—"monochromatically".

The determination of the content of niobium was carried out along the line $K_{a_{1,2}}$, the sensitivity of the method was 0.05%. Determination of the tungsten content was carried out along the line $K_{a_1}$, the sensitivity of the method was 0.003%. The background in the analysis was considered by linear interpolation and by using a blank sample. Samples of materials for X-ray fluorescence analysis were prepared by compressing them in the form of tablets with NaCl (57653 SIGMA-ALDRICH≥99.5% (AT)) at a pressure of 4000 kg/cm². The instrument was calibrated using samples containing fixed amounts of niobium pentoxide (203920 ALDRICH 99.99% trace metals basis) and tungsten (VI) oxide (204781 powder, ALDRICH 99.995% trace metals basis).

Sorption-Selective Parameters

The following characteristics are taken as parameters describing sorption-selective properties: a total exchange capacitance $E_{Li0}$, obtained by using 0.1 N LiOH solution as a sorbent; a selective lithium capacitance $El_{i1}$ used for sorption from a solution of lithium and sodium salts at an ionic ratio Li⁺:Na⁺ in the range of 1 to 10 at pH=12; and a coefficient $P_{Li,Na}$ of selectivity of the sorbent concerning lithium, which is a direct parameter that characterizes separation of lithium from sodium and which is represented by the following formula:

$$P_{Li,Na} = \frac{E_{Li1} \cdot C_{Na}}{E_{Na1} \cdot C_{Li}},$$

where $E_{Li1}$ is a selective lithium capacity at sorption from a solution of lithium and sodium salts at ionic ratio Li⁺/Na⁺ of 1/10 at pH=12 (mg-eqv/g of sorbent);

$E_{Na1}$ is a sodium capacity at sorption from a solution of lithium and sodium salts at ionic ratio Li⁺/Na⁺ of 1/10 at pH=12 (mg-eqv/g of sorbent);

$C_{Li}$ is a molar concentration of Li⁺ in a solution of lithium and sodium salts at ionic ratio Li⁺/Na⁺ of 1/10 at pH=12 (mol/l);

$C_{Na}$—molar concentration of Na⁺ in a solution of lithium and sodium salts at ionic ratio Li⁺/Na⁺ of 1/10, pH=12 (mol/l).

EXAMPLES

Example 1

A 2-liter of 0.05M K₃NbO₄ solution (pH=12.7) was combined with a given amount of 0.05M K₂WO₄ solution. Then, with vigorous stirring, a 1.0 M HCl solution is poured in until a suspension with pH=5-6 is obtained and precipitated, thus producing a precipitate. The resulting precipitate is washed by successive decantation to a residual potassium concentration of 0.08-0.09 g/l and frozen at −5° C. for 30 hours. After thawing, the granulate is placed in an ion exchange column, and 4.5 l of 0.1 M lithium carbonate solution is passed through. The precipitate is unloaded from the column, dried in the air, heated to a temperature of 400-500° C. (temperature rise rate 10 deg/min), and maintained at this temperature for 3 hours. As a result, a sorbent is obtained in the lithium form, whose main fraction is granules 0.1-0.5 mm in size.

The effect of synthesis conditions in obtaining an ion exchanger on its sorption properties is summarized in the Table 1. This table presents the results of tests of sorbents obtained at various synthesis conditions but within the scope of the present invention. In the ion-exchange test, a solution of the following composition (g/l) is used: Li₂CO₃-5.5; NaCl: 53.0; NaOH-3.0 (pH=12.1). Desorption of lithium from the sorbent is carried out using a 0.1 M HNO₃ solution.

TABLE 1

Influence of synthesis conditions on compositions and properties of sorbents
(synthesis under conditions within the scope of the present invention)

| The sorbent | | | Test results | | | |
|---|---|---|---|---|---|---|
| obtaining conditions | | | | Selective | Li—Na | The output of |
| W(VI):Nb(V) ratio in solution during synthesis | Treatment temperature T, ° C. | Sorbent composition* | Total ion exchange capacity $E_{Li0}$, mg-eqv/g | capacity by Li, $E_{Li1}$, mg-eqv/g | separation coefficient, $P_{Li,Na}$ | the fraction 0.2 ÷ 0.7 mm, mass % |
| 0.019:1 | 450 | H₀.₆₅NbO₂.₈₂•0.05Li₂O•0.02WO₃ | 2.21 | 1.87 | 54.1 | 97 |
| 0.033:1 | 420 | H₀.₆₅NbO₂.₈₂•0.05Li₂O•0.03WO₃ | 2.35 | 2.05 | 68.0 | 98 |
| 0.041:1 | 470 | H₀.₆₅NbO₂.₈₂•0.05Li₂O•0.04WO₃ | 2.41 | 2.12 | 72.2 | 96 |
| 0.055:1 | 400 | H₀.₆₉NbO₂.₈₅•0.03Li₂O•0.05WO₃ | 2.52 | 2.26 | 86.0 | 98 |
| 0.070:1 | 450 | H₀.₇₀NbO₂.₈₅•0.03Li₂O•0.07WO₃ | 2.56 | 2.32 | 96.3 | 95 |
| 0.086:1 | 460 | H₀.₆₇NbO₂.₈₃•0.04Li₂O•0.09WO₃ | 2.40 | 2.18 | 97.6 | 94 |
| 0.106:1 | 450 | H₀.₆₁NbO₂.₈₀•0.07Li₂O•0.10WO₃ | 2.27 | 2.04 | 88.5 | 98 |
| 0.120:1 | 430 | H₀.₅₄NbO₂.₇₇•0.10Li₂O•0.12WO₃ | 2.00 | 1.76 | 74.8 | 97 |
| 0.140:1 | 460 | H₀.₅₀NbO₂.₇₇•0.12Li₂O•0.14WO₃ | 1.81 | 1.58 | 68.0 | 95 |
| 0.200:1 | 500 | H₀.₄₅NbO₂.₇₇•0.14Li₂O•0.20WO₃ | 1.22 | 1.03 | 54.0 | 94 |
| 0.070:1 | 380 | H₀.₇₀NbO₂.₈₅•0.01Li₂O•0.07WO₃ | 2.51 | 2.02 | 41.3 | 95 |
| 0.070:1 | 550 | H₀.₇₀NbO₂.₈₅•0.03Li₂O•0.07WO₃ | 2.03 | 1.84 | 96.3 | 95 |

*The composition of the sorbent prepared for sorption of lithium (H-form)

Example 2

To compare the properties of the sorbents prepared by the method of the invention and conventional methods, weights of sorbents (50 g each) are placed in ion exchange columns with parameters of 3.2 cm²×30 cm. sorption is conducted from a solution containing (g/l): $Li_2SO_4$-5.5; NaCl-56.0; NaOH-3.0; pH=12.1.

Tests of sorbents are carried out in the following sequence. The sorbents are loaded into columns and treated with solutions of $HNO_3$ at a concentration of 0.2 mol/l. The columns are then washed with water until the media's reaction becomes neutral, and lithium is sorbed from the solutions of the above compositions (filtration rate: 40-60 ml/h, flowing volume: 1500-1600 ml). After the sorption of lithium, the columns are washed with water (300-400 ml), and ion exchangers are regenerated under the action of 0.1-0.2 mol/l of $HNO_3$. At the regeneration stage, the filtration rate is maintained at about 100 ml/h, and 800-900 ml of the solution is passed. After completion of regeneration, the columns are washed with water until the media become neutral, and a new lithium sorption cycle is started. In total, during the tests, five sorption/desorption cycles are conducted. The averaged test results are shown in Table 2.

TABLE 2

Sorbent Test Results with Model Solutions

| Sorbent | Exchange capacity, mg-eqv/g | | Li—Na separation coefficient, $P_{Li, Na}$ | Losses per one working cycle, % | Column Treated Volumes |
|---|---|---|---|---|---|
| | $E_{Li1}$ | $E_{Na1}$ | | | |
| According to the invention | 2.35 ± 0.20 | 0.25 ± 0.03 | 96 ± 5 | 1.5 | 91 ± 8 |
| Conventional | 1.42 ± 0.20 | 0.36 ± 0.04 | 38 ± 6 | 2.1 | 51 ± 7 |

As shown in Table 2, the sorbent obtained according to the proposed method has sorption-selective characteristics and chemical stability more than two times higher than the sorbent obtained by the known methods.

Example 3

In these series of tests, experiments are conducted for testing a synthesized sorbent by sorption from a natural underground brine of high mineralization. To compare the properties of the sorbents prepared by the method of the invention and conventional methods, weights of sorbents (50 g each) are placed in ion exchange columns with parameters of 3.2 cm²×30 cm.

The brine has the following composition (g/l): $Li^+$0.013; $Na^+$-76.0; $K^+$-2.7; $Mg^{2+}$-3.8; $Ca^{2+}$-19.5; $NH_4^+$-0.13; $Cl^-$-154; $Br^-$- 0.7; $I^-$-0.01; $SO_4^{2-}$-0.12; $HCO_3^-$-0.07; pH=8,7. Prior to desorption, the sorbent is washed with a 0.1M $NH_4Cl$ solution to remove salting-out alkaline earth ions. The desorption is conducted with a solution of 0.1N $HNO_3$.

Comparative data on the characteristics of sorbents obtained by the known and proposed methods are presented in Table 3.

TABLE 3

Sorbent Test Results on Real Natural Brines

| Sorbent | Exchange capacity, mg-eqv/g | | Li—Na separation coefficient, $P_{Li, Na}$ | Losses per one working cycle, % | Column Treated Volumes |
|---|---|---|---|---|---|
| | $E_{Li1}$ | $E_{Na1}$ | | | |
| According to the invention | 2.31 ± 0.20 | 0.26 ± 0.03 | (5.4 ± 0.2) · 10⁴ | 0.9 | 4400 ± 200 |
| Conventional | 0.87 ± 0.11 | 0.18 ± 0.02 | (0.9 ± 0.1) · 10⁴ | 1.3 | 1800 ± 200 |

The invention has been shown and described with reference to specific examples. It is understood that these examples should not be construed as limiting the invention application and that any changes are possible within the limits of the attached claims.

The invention claimed is:

1. An inorganic ion-exchanger in the form of solid particles comprising a chemical non-stoichiometric compound in the form of an inorganic polymeric aqua-oxo-hydroxo complex intended for selective extraction of lithium from lithium-containing natural and industrial brines, the inorganic ion-exchanger being represented by the following general formula:

$$H_aNbO_{(2.5+0.5 \cdot a)} \cdot bLi_2O \cdot cWO_3 \cdot dH_2O;$$

wherein:
"a" is a number ranging from 0.5 to 2.0,
"b" is a number ranging from 0.01 to 0.5,
"c" is a number ranging from 0.01 to 0.2, and
"d" is a number ranging from 0.1 to 2.0.

2. The inorganic ion-exchanger, according to claim 1, wherein the polymeric aqua-oxo-hydroxo complex is a polymeric aqua-oxo-hydroxo complex of niobium and tungsten.

3. The inorganic ion-exchanger, according to claim 2, wherein the polymeric aqua-oxo-hydroxo complex of niobium and tungsten is a mixed polynuclear complex.

4. The inorganic ion-exchanger, according claim 1, which has a total ion exchange capacity of at least 2.8 meq/g and an ion-exchange capacity specifically to lithium of at least 2.3 meq/g.

5. The inorganic ion-exchanger, according to claim 2, which has a total ion exchange capacity of at least 2.8 meq/g and an ion-exchange capacity specifically to lithium of at least 2.3 meq/g.

6. The inorganic ion-exchanger, according to claim 3, which has a total ion exchange capacity of at least 2.8 meq/g and an ion-exchange capacity specifically to lithium of at least 2.3 meq/g.

7. The inorganic ion-exchanger of claim 1, wherein the solid particles have dimensions in the range of 0.1 to 2.0 mm.

8. The inorganic ion-exchanger of claim 2, wherein the solid particles have dimensions in the range of 0.1 to 2.0 mm.

9. The inorganic ion-exchanger of claim 4, wherein the solid particles have dimensions in the range of 0.1 to 2.0 mm.

10. The inorganic ion-exchanger of claim 6, wherein the solid particles have dimensions in the range of 0.1 to 2.0 mm.

* * * * *